United States Patent
Liu et al.

(10) Patent No.: US 6,773,842 B2
(45) Date of Patent: Aug. 10, 2004

(54) METAL-AIR BATTERY WITH AN EXTENDED SERVICE LIFE

(75) Inventors: Jean Liu, Auburn, AL (US); Wayne Huang, Auburn, AL (US)

(73) Assignee: Nanotek Instruments, Inc., Fargo, ND (US)

( * ) Notice: Subject to any disclaimer, the term of this patent is extended or adjusted under 35 U.S.C. 154(b) by 304 days.

(21) Appl. No.: 10/105,495

(22) Filed: Mar. 26, 2002

(65) Prior Publication Data

US 2003/0186099 A1 Oct. 2, 2003

(51) Int. Cl.[7] .................... H01M 4/00; H01M 2/00; H01M 2/10; H01M 2/12; H01M 10/48
(52) U.S. Cl. ..................... 429/27; 429/61; 429/71; 429/82; 429/93
(58) Field of Search .................. 429/27, 61, 71, 429/82, 93

(56) References Cited

U.S. PATENT DOCUMENTS

| | | | |
|---|---|---|---|
| 4,118,544 A | 10/1978 | Przybyla et al. | 429/27 |
| 4,139,679 A | 2/1979 | Appleby et al. | 429/21 |
| 4,177,327 A | 12/1979 | Mathews et al. | 429/27 |
| 4,189,526 A | 2/1980 | Cretzmeyer et al. | 429/13 |
| 4,262,062 A | 4/1981 | Zatsky | 429/27 |
| 4,490,443 A | 12/1984 | Ruch et al. | 429/27 |
| 4,620,111 A | 10/1986 | McArthur et al. | 307/150 |
| 4,910,102 A | 3/1990 | Rao et al. | 429/51 |
| 4,913,983 A | 4/1990 | Cheiky | 429/13 |
| 5,069,986 A | 12/1991 | Dworkin et al. | 429/27 |
| 5,116,695 A | 5/1992 | Rao et al. | 429/12 |
| 5,166,011 A | 11/1992 | Rao et al. | 429/219 |
| 5,191,274 A | 3/1993 | Lloyd et al. | 320/2 |
| 5,196,275 A | 3/1993 | Goldman et al. | 424/27 |
| 5,225,291 A | 7/1993 | Rao | 429/51 |
| 5,250,370 A | 10/1993 | Faris | 429/68 |
| 5,318,861 A | 6/1994 | Harats et al. | 429/21 |
| 5,418,080 A | 5/1995 | Korall et al. | 429/27 |
| 5,472,803 A | 12/1995 | Flanagan | 429/70 |
| 5,569,551 A | 10/1996 | Pedicini | 429/27 |
| 5,639,568 A | 6/1997 | Pedicini | 429/27 |
| 5,691,074 A | 11/1997 | Pedicini | 429/27 |

*Primary Examiner*—Patrick Ryan
*Assistant Examiner*—Thomas H. Parsons

(57) ABSTRACT

A battery comprising a control means and a plurality of metal-air cell assemblies that are electronically connected in parallel. Each cell assembly comprises a casing with a controllable air vent thereon and at least a metal-air cell inside the casing. The controllable air vent is closed during a battery storage period and is opened in response to a programmed signal in order to allow outside air or oxygen to enter the assembly through the air vent to activate the operation of the corresponding cell assembly. The control means, preferably including a sampling unit, a power control unit and a logic control unit, is capable of sensing the battery output voltage and sending programmed signals to open or close up the air vents at the same time or at different moments of time in a programmed fashion.

16 Claims, 10 Drawing Sheets

METAL-AIR BATTERY WITH AN EXTENDED SERVICE LIFE

BACKGROUND OF THE INVENTION

1. Field of the Invention

The present invention relates to a battery with a long operating life. In particular, this invention relates to a multiple-cell battery with the constituent metal-air cells being activated in a programmed-timing manner to achieve an extended operating life and better utilization of the capacity of individual cells.

2. Brief Description of the Prior Art

Metal-air batteries produce electricity by the electrochemical coupling of a reactive metallic anode to an air cathode through a suitable electrolyte in a cell. The air cathode is typically a sheet-like member, having one surface exposed to the atmosphere and another surface exposed to the aqueous electrolyte of the cell. During cell operation oxygen is reduced within the cathode while anode metal is oxidized, providing a usable electric current flow through an external circuit connected between the anode and the cathode. The air cathode must be permeable to air but substantially impermeable to aqueous electrolyte, and must incorporate an electrically conductive element to which the external circuit can be connected. Commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, lithium, aluminum, magnesium and alloys of these elements are considered especially advantageous owing to their low cost, light weight, and ability to function as anodes in metal-air batteries using a variety of electrolytes.

As an example, a typical aluminum-air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. Aqueous electrolytes for metal-air batteries consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In neutral-pH electrolyte, the cell discharge reaction may be written as:

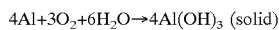
$$4Al + 3O_2 + 6H_2O \rightarrow 4Al(OH)_3 \text{ (solid)}$$

In alkaline electrolyte, the cell discharge reaction may be written:

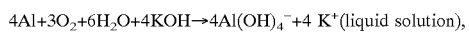
$$4Al + 3O_2 + 6H_2O + 4KOH \rightarrow 4Al(OH)_4^- + 4 K^+ \text{(liquid solution)},$$

followed, after the dissolved potassium (or sodium) aluminate exceeds a saturation level, by:

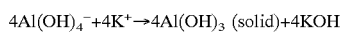
$$4Al(OH)_4^- + 4K^+ \rightarrow 4Al(OH)_3 \text{ (solid)} + 4KOH$$

In addition to the above oxygen-reducing reactions, there is also an undesirable, non-beneficial reaction of aluminum in both types of electrolyte to form hydrogen, as follows:

$$2Al + 6H_2O \rightarrow 2Al(OH)_3 + 3H_2 \text{ (gas)}.$$

Th above equations and similar equations for other types of metal-air cells indicate the importance of regulating the ingress rate of oxygen. Once oxygen is admitted into a metal-air cell, discharge reactions will proceed regardless if the cell is being used or not to power an external device.

There is a need for a metal-air battery which can be used as an emergency power source at locations where electric supply lines do not exist. Such a battery must have a high energy capacity and a high power density and be capable of running for a long period of time under high load. There is also a need for a metal-air battery that can provide much extended "talk time" and "stand-by" time for a mobile phone. A need also exists for a battery that can power a notebook computer for a much longer period of time (e.g., 12 hours being needed to last for a trans-Pacific flight).

State-of-the-art metal-air batteries have exhibited the following drawbacks:

(1) Severe "anode passivation" problem: When the battery is run under high load, large amounts of aluminum hydroxide accumulate on the aluminum anode surface blocking the further access of anode by the electrolyte. In the case of zinc-air cells, zinc oxide layers prevent further access of zinc anode by the electrolyte. Such an anode passivation phenomenon tends to prevent the remaining anode active material (coated or surrounded by a ceramic layer) from contacting the electrolyte. Consequently, the electron-generating function ceases and the remaining active anode material can no longer be used (hence, a low-utilization anode). All metal anodes used in state-of-the-art metal-air batteries suffer from the anode passivation problem to varying degrees.

(2) Severe self-discharge and current leakage problems: "Self-discharge" is due to a chemical reaction within a battery that does not provide a usable electric current. Self-discharge diminishes the capacity of a battery for providing a usable electric current. For the case of a metal-air battery, self-discharge occurs, for example, when a metal-air cell dries out and the metal anode is oxidized by the oxygen that seeps into the battery during periods of non-use. Leakage current can be characterized as the electric current that is supplied to a closed circuit by a metal-air cell even when air is not continuously provided to the cell. These problems also result in a low-utilization anode.

(3) Severe corrosion problem: Four metals have been studied extensively for use in metal-air battery systems: zinc (Zn), aluminum (Al), magnesium (Mg), and lithium (Li). Despite the fact that metals such as Al, Mg, and Li have a much higher energy density than zinc, the three metals (Al, Mg, and Li) suffer from severe corrosion problems during storage. Hence, Mg-air and Al-air cells are generally operated either as "reserve" batteries in which the electrolyte solution is added to the cell only when it is decided to begin the discharge, or as "mechanically rechargeable" batteries which have replacement anode units available. The presence of oxygen tends to aggravate the corrosion problem. Since the serious corrosion problem of Zn can be more readily inhibited, Zn-air batteries have been the only commercially viable metal-air systems. It is a great pity that high energy density metals like Al, Mg and Li have not been extensively used in a primary or secondary cell.

Due to their high energy-to-weight ratio, safety of use, and other advantages, metal-air, and particularly zinc-air, batteries have been proposed as a preferred energy source for use in electrically-powered vehicles. However, just like aluminum-air cells, zinc-air batteries also suffer from the problem of "passivation", in this case, by the formation of a zinc oxide layer that prevents the remaining anode active material (Zn) from contacting the electrolyte.

A number of techniques have been proposed to prevent degradation of battery performance caused by zinc oxide passivation or to somehow extend the operating life of a metal-air battery. In one technique, a sufficient (usually excessive) amount of electrolyte was added to allow most of the zinc to dissolve (to become Zn ion and thereby giving up the desired electrons). The large amount of electrolyte added significantly increased the total weight of the battery system and, thereby, compromising the energy density.

In a second approach, anodes are made by compacting powdered zinc onto brass current collectors to form a porous mass with a high surface/volume ratio. In this configuration, the oxide does not significantly block further oxidation of the zinc, provided that the zinc particles are sufficiently small. With excessively small zinc particles, however, zinc is rapidly consumed due to self-discharge and leakage (regardless if the battery is in use or not) and even more serious corrosion problems and, hence, the battery will not last long.

In a third approach, particularly for the development of metal-air batteries as a main power source for vehicle propulsion, focus has been placed on "mechanically rechargeable" primary battery systems. Such a system normally comprises a consumable metal anode and a nonconsumable air cathode, with the metal anode being configured to be replaceable once the metal component therein is expended following oxidation in the current-producing reaction. These systems constituted an advance over the previously-proposed secondary battery systems, which have to be electrically charged for an extended period of time once exhausted, and require an external source of direct current.

Most of these mechanically rechargeable systems are quite complex in construction. For instance, the system disclosed in U.S. Pat. No. 4,139,679 (Feb. 13, 1979 to A. Appelby, et al.) contains an active particulate metal anode component freely suspended in an alkaline electrolyte, and a pump to keep the particulate metal anode in suspension and circulated between air cathodes. After discharge of the metal anode component, the electrolyte is then replaced with an electrolyte containing a fresh particulate metal anode component in suspension.

Mechanically rechargeable metal-air batteries with mechanically replaceable anodes have been further developed, e.g., in U.S. Pat. No. 5,196,275 (Mar. 23, 1993 to Goldman, et al.); U.S. Pat. No. 5,318,861 (Jun. 7, 1994 to Harats, et al.); and U.S. Pat. No. 5,418,080 (May 23, 1995 to Korall, et al.). These systems have been designed particularly for use in electric vehicle propulsion, since they facilitate quick recharging of the vehicle batteries simply by replacing the spent anodes, while keeping the air cathodes and other battery structures in place. This mechanical recharging, or refueling, may be accomplished in service stations dedicated to that purpose. However, it is necessary to provide metal-air battery cells that will repeatedly allow insertion and removal of the zinc anode elements for each charge/discharge cycle without causing wear and tear to the mechanically-sensitive air electrode flanking each zinc anode.

Another approach to extending the discharge life of a metal-air battery is the "variable-area dynamic anode" method proposed by Faris (e.g., U.S. Pat. No. 5,250,370, Oct. 5, 1993). Such a battery structure includes electrodes which are moved relative to each other during operation. The electrodes also have areas that are both different in size, with ratios that are variable. The battery structure includes a first electrode which is fixed in a container. A second electrode is moved past the fixed electrode in the container and battery action such as discharge occurs between proximate areas of the first and second electrodes. A third electrode may be provided in the container to recharge the second electrode as areas of the second electrode are moved past the third electrode at the same time that other areas of the second electrode are being discharged at the first electrode. The ratio of the third electrode area to the first electrode area is much larger than 1, resulting in a recharge time that is much faster, thereby improving the recharge speed. However, this battery structure is very complicated and its operation presents a reliability problem.

Attempts to extend the operating life of a metal-air battery also include the utilization of a deferred actuated battery system, e.g., B. Rao, et al. (U.S. Pat. No. 4,910,102, Mar. 20, 1990; U.S. Pat. No. 5,116,695, May 26, 1992; U.S. Pat. No. 5,166,011, Nov. 24, 1992, and U.S. Pat. No. 5,225,291, Jul. 6, 1993) and J. Ruch, et al. (U.S. Pat. No. 4,490,443, Dec. 25, 1984). Intermittent transfer of electrolyte between cells and a reservoir was proposed by Flanagan (U.S. Pat. No. 5,472,803). These batteries involve the operation of a complicated electrolyte delivery system.

In U.S. Pat. No. 5,691,074 (Nov. 25, 1997), Pedicini proposed a diffusion-controlled air vent containing isolating passageways that function to limit the amount of oxygen that can reach the oxygen electrodes when the fan is off and the internal humidity level is relatively constant. This isolation reduces the self-discharge and leakage or drain current of the metal-air cells. In U.S. Pat. No. 5,569,551 (Oct. 29, 1996) and U.S. Pat. No. 5,639,568 (Jun. 17, 1997), Pedicini, et al. proposed the use of an anode bag to limit self-discharge of the cell in an attempt to maintain the capacity of the cell. It was stated that, by wrapping the anode in a micro-porous membrane that is gas-impermeable and liquid-permeable, oxygen from the ambient air that has seeped into the cell must go through a solubility step before it can pass through the anode bag to contact and discharge the anode. However, this solubility step is often not a slow step particularly when the oxygen or air ingress rate into the cell is high. This anode bag provides only a moderately effective approach to reducing the self-discharge problem. This is achieved at the expense of making the cell structure very complicated.

A "restricted gas passageway" concept was proposed much earlier by Przybyla, et al. (U.S. Pat. No. 4,118,544, Oct. 3, 1978) to restrict gas access to the cathode by way of a very small aperture in the cell container, or an additional barrier layer placed within the layer. Oxygen diffusivity-limiting membrane was used by Cretzmeyer, et al. (U.S. Pat. No. 4,189,526, Feb. 19, 1980) to improve the active life of a metal-oxygen cell. Several attempts were made to employ a switch or valve to regulate the flow of oxygen into a metal-air cell. Examples include U.S. Pat. No. 4,262,062 (Apr. 14, 1981 to Zatsky), U.S. Pat. No. 4,620,111 (Oct. 28, 1986 to McArthur, et al.), U.S. Pat. No. 5,191,274 (Mar. 2, 1993 to Lloyd, et al.), U.S. Pat. No. 5,069,986 (Dec. 3, 1991 to Dwaorkin, et al.), and U.S. Pat. No. 4,913,983 (Apr. 3, 1990 to Cheiky). Mathews, et al. (U.S. Pat. No. 4,177,327, Dec. 4, 1979) also recognized the importance of intermittently switching on/off an air vent to a metal-air battery for an improved operating life. An electrical actuator is effected to open the air vent only when the battery is supplying electric power to a load. In this manner, the battery is open to the possibility of harsh ambient conditions such as very high or very low ambient relative humidity, prolonged carbon dioxide exposure, etc. However, in the batteries proposed by Mathews, et al. and others cited above, a switch or valve must be manually operated to turn on and off an air access vent and the timing at which this on/off operation is carried out must be determined by the user of the external device. Quite often, this user does not know if the battery in operation is running low in power and should be replaced or recharged immediately. Further, these prior-art batteries are each composed of an assembly of metal-air cells connected in series (e.g., in Mathews, et al.) and they do not address the issues of timing at which an individual cell assembly is actuated.

Therefore, it is an object of the present invention to provide a smart battery that is composed of a multiplicity of metal-air cell assemblies that can be separately actuated in a programmed fashion. Such a programmed fashion could include a sequential fashion, in which the cell assemblies are actuated or switched on one after another. They can be switched off at the same time or at different times.

It is another object of the present invention to provide a battery that exhibits little or no anode passivation, self-discharge, current leakage, and/or anode corrosion problems A specific object of the present invention is to provide a metal-air battery that has a long operating life.

SUMMARY OF THE INVENTION

The present invention provides a multiple-cell battery comprising at least a first metal-air cell assembly and a second metal-air cell assembly electronically connected in parallel. There can be several cell assemblies (any desired number of assemblies in a battery), however. The first cell assembly comprises at least a metal-air cell (normally several cells connected in series), a casing that houses these cells, a controllable air vent on the casing that is closed during a battery storage period. This air vent is opened in response to a programmed signal in order to allow outside air or oxygen to enter this cell assembly to activate the operation of the first metal-air cell assembly and, hence, the battery. The second cell assembly (and the third, fourth, etc.) is similarly configured so that its controllable air vent is closed during a battery storage period and is opened in response to a programmed signal in order to allow outside air or oxygen to enter the assembly when needed to activate the operation of the second metal-air cell assembly. The battery also comprises control means for sending programmed signals to open up the first and second vents (and third, fourth, etc.) at the same time or at different moments of time in a programmed fashion.

Inside any of the cell assemblies, it is possible to include one or more electrochemical cells that are not metal-air cells. These cells, metal-air cells or not, are preferably connected in series, but some of them can be connected in parallel.

Preferably, all the air vents are closed when the battery is not in operation. The air vents are each equipped with an electrically operated actuator means that operates to open or close the corresponding air vent responsive to programmed signals from the control means. The actuator can comprise an actuator element selected from the group consisting of a bi-metal device, a thermo-mechanical device, a piezo-electric device, a shape memory alloy, an electromagnetic element, or a combination thereof. The control means comprises a sampling unit and a logic circuit to determine the timing at which an air vent is opened or closed. Preferably, the battery further comprises a power-control unit to regulate the power input to the logic control unit. Most preferably, the battery is capable of autonomously switching off the power input to other circuit elements than the sampling unit in order to conserve the battery power after the control unit determines that no opening or closing of any of the air vents is needed. The sampling unit, which is designed to draws a minimal amount of current, is allowed to stay on at all times.

The controllable air vents are preferably re-sealable and are re-closed responsive to programmed signals from the control means. Preferably, the second controllable air vent (or the third, fourth, etc.) is opened when the voltage output of the battery, when in operation, drops below a predetermined low threshold voltage. At least one of the controllable air vents is re-closed when a voltage output of the battery exceeds a predetermined high threshold voltage.

The battery is so designed that the programmed fashion includes the mode of sequential timing at which the air vents are opened or closed in a predetermined sequential fashion.

The battery preferably further comprises a main casing to house all the cell assemblies. In this case, the main casing comprises a main air vent which is closed during an initial battery storage period and is opened manually to begin the operation of the battery. It is preferably designed in such a way that the first air vent is at least slightly cracked open when this main air vent is opened for the first time. Most preferably, one of the air vents remains open (e.g., the first air vent) while the main air vent for the main casing remains closed during the initial battery storage period. In this manner, the first cell assembly becomes activated once the main air vent is opened. After this first step of manually opening the main air vent, the closing and opening operations of all the controllable air vents (including the first one) for the cell assemblies are to be dictated by the control means in a programmed fashion.

DESCRIPTION OF THE PREFERRED EMBODIMENTS

Figure 1:
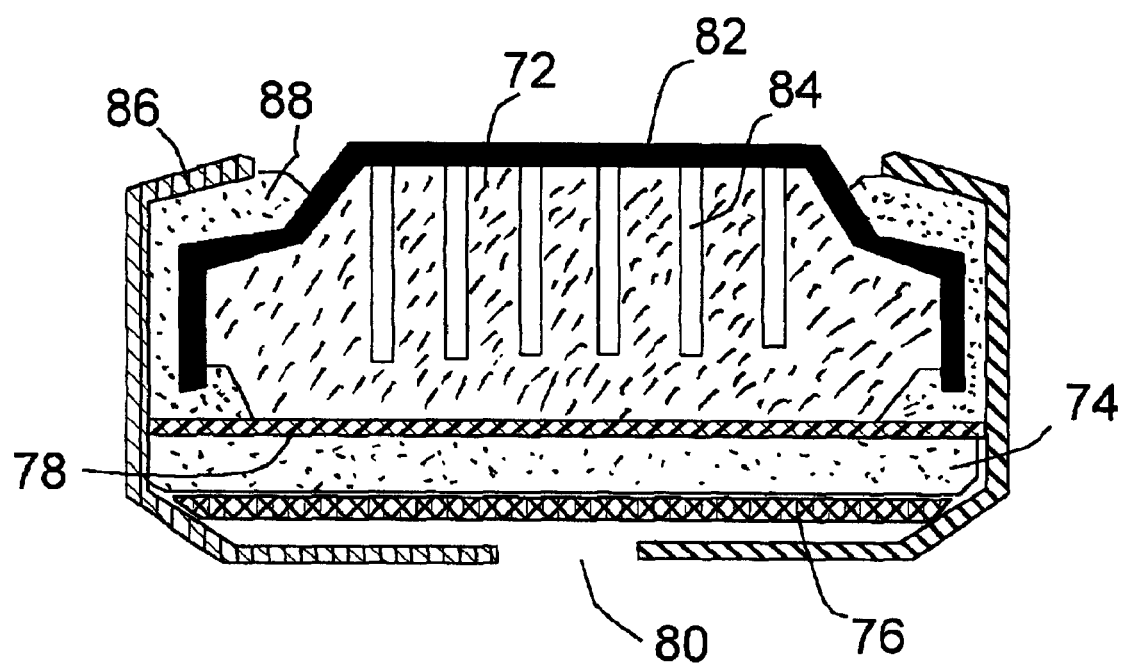
FIG. 1 Cross-section of a button-shaped metal-air cell, wherein the anode active material (e.g., Zn or Al particles) is surrounded by an electrolyte (e.g., KOH solution).

An electrochemical cell typically includes a cathode, an electrolyte in ionic contact with the cathode, and an anode in physical contact with the electrolyte. FIG. 1 shows one example of an electrochemical cell, which is a button-type metal-air battery. This battery contains an air access port 80 and an air-diffusion membrane 76 through which oxygen may enter the cell through a porous cathode 74 (which preferably contains some electro-catalyst) and a separator 78. In FIG. 1, an anode 72 is shown to be in the form of fine metal particles dispersed in an electrolyte solution. Anode current collectors 82, 84 are in electronic contact with the anode 72. An insulating gasket 88 is positioned between the anode current collector 82 and a steel casing 86. This and other types of metal-air cells, with the air access port being open and readily accessible by the surrounding air, can be used as a part of the presently invented battery.

A preferred embodiment of the present invention is a battery that is composed of a plurality of electrochemical cell assemblies that are, preferably, electrically connected in parallel. Each cell assembly includes at least a metal-air cell and can include a number of cells connected in series, in parallel, or both. Most preferably, each assembly is composed of a desired number of metal-air cells that are connected in series. However, an assembly is allowed to contain an electrochemical cell that is not a metal-air cell. The number of cells inside an assembly depends upon the battery output voltage and maximum current desired. For instance, 5 metal-air cells (each providing 1.2 volts/1 amp) connected in series provide a battery output voltage of 6 volts/1 amp. Although it is most preferred that the cell assemblies are connected in parallel if more current is needed, some cell assemblies may be allowed to be connected in series if higher voltage is needed.

Figure 2:
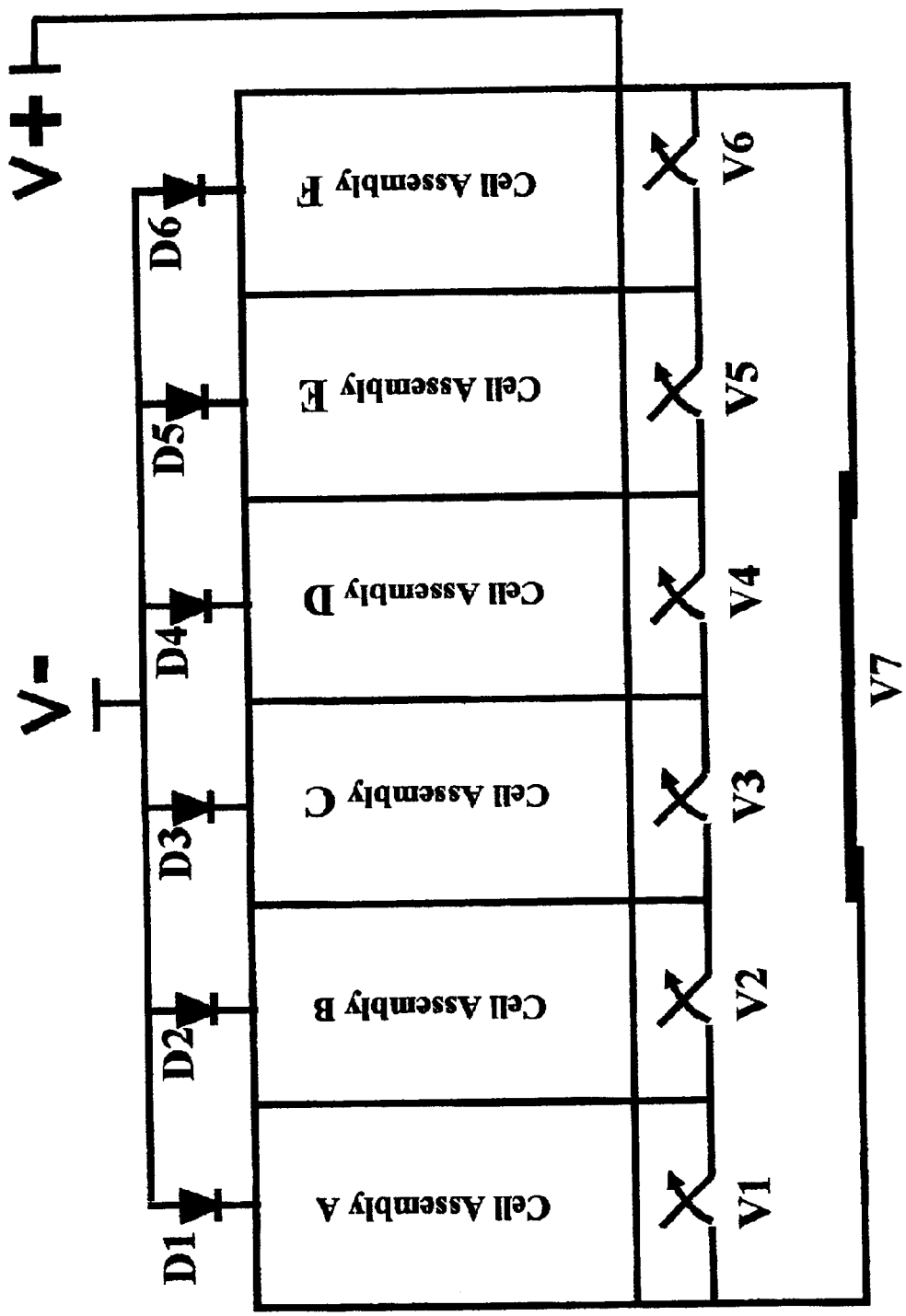
FIG. 2 Schematic of a metal-air battery composed of a plurality of cell assemblies.

Preferably each cell assembly comprises at least one metal-air cell (typically 2 to 10 metal-air cells) and a casing to house all the cells in this assembly. The casing contains thereon a controllable air vent (e.g., V1 through V6 for cell assemblies A through F, respectively, in FIG. 2) that is closed during a battery storage period and is opened in response to a programmed signal in order to allow outside air or oxygen to enter the metal-air cells through this air vent to activate the operation of this metal-air cell assembly. At least two (typically more than 2) similarly configured cell assemblies are packed together and housed inside a main casing to form a complete battery (6 cell assemblies are shown in FIG. 2). This main casing also has a main air vent, which is preferably closed during a battery storage period (e.g., prior to the first usage of this battery), but is easily opened at the start-up of the battery operation. Preferably this main air vent is re-sealed when the battery is not in use.

The battery also comprises a control means for sending programmed signals to open or close up the air vents at the same time or at different moments of time in a programmed fashion (including a sequential fashion). Typically, the instant of time at which a controllable air vent for a cell assembly is opened for the first time is different from the instants of time at which the air vents for other cell assemblies are opened for the first time. The most ideal situation is to open up a vent only when its corresponding cell assembly is needed to contribute to the provision of power by the battery to an external load (a device or appliance such as a mobile phone or lap-top computer). Hence, it is desirable to open up the first vent (e.g., V1) to allow oxygen to enter all the metal-air cells in the first cell assembly (e.g., Assembly A) when a battery is to be used for the first time. In a continuous usage situation, it is desired that most, if not all, of the power in this first cell assembly is fully utilized before a second cell assembly is activated by opening up the second vent. When not in use, the second and other cell assemblies should be isolated from outside air or oxygen. Once air is admitted into a metal-air cell, undesirable effects such as self-discharge, oxidation and passivation would proceed to some extent regardless if the battery is being used or not. It is therefore highly advantageous not to expose a metal-air cell to oxygen until this cell is needed to help in powering an external device. The present battery is designed to realize this goal.

Electronic devices such as laptop computers, palm computers and mobile phones are often subject to an intermittent use condition, i.e. they are used for a while, switched off, and then switched on again after a period of dormant time. In the case of an intermittent battery use, the vents to those already-activated metal-air cells are preferably re-sealed to avoid an excessive self-discharge (once air is admitted into a cell, some degree of self-discharge is un-avoidable, but re-sealing helps to alleviate this problem). These controllable air vents for different cell assemblies may be re-closed all at the same time or at different times when the external device no longer draws any current from the battery. The presently invented battery is capable of automatically performing the re-sealing steps in a programmed fashion.

Preferred Structure of the Battery

Figure 3:
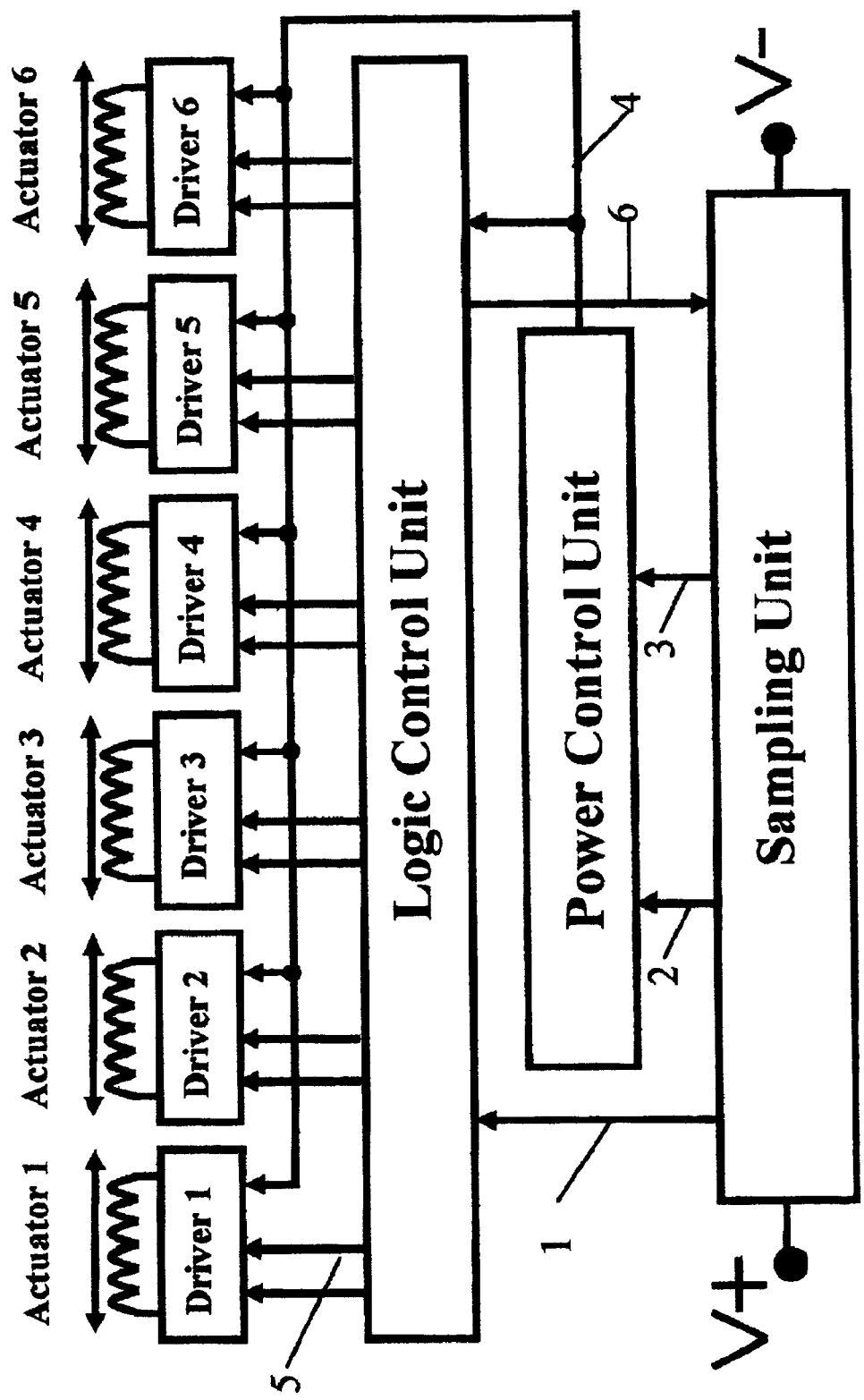
FIG. 3 Schematic of a control unit used in the battery of FIG. 2.

As an example to illustrate the preferred embodiment, the presently invented battery consists of a main body (FIG. 2) and its electronic control unit (FIG. 3). Six electrochemical cell assemblies, A through F, and their associated components are shown to constitute the main body (see FIG. 2). These associated components include six respective diodes, D1–D6, which serve to protect the battery just in case any cell assembly is broken to become a short circuit. Six controllable air vents V1–V6, which are driven by their respective drivers (e.g., electromagnetic actuator devices) act as access paths for outside air. An optional air vent V7, which may simply be a seal, is a main entrance for air. This seal preferably can be readily opened manually and further preferably is re-sealable. Each cell assembly is composed of at least one metal-air cell (but could be several basic metal-air cells connected in series, in parallel, or a combination, depending on how high the battery voltage or current is needed). Some of these cells could include other types of electrochemical cells, but at least one is a metal-air cell in one cell assembly. The negative poles of the diodes are connected together as the negative pole of the whole battery and are labeled as V− in FIG. 2. All the air cathodes of the six cell assemblies are connected together as the battery positive pole labeled as V+.

FIG. 3 schematically shows a preferred structure of the electronic control unit of the battery. It is made up of a sampling unit, a power control unit, a logic control unit, and six drivers for the six respective actuators. The actuators shown here are electromagnetic devices that can undergo sliding or rotational motions to open/close the six respective controllable air vents. However, there are a wide variety of actuators that can be used for the practice of the present invention. For instance, an actuator element may be selected from the group consisting of a bi-metal device, a thermo-mechanical device, a piezo-electric device, a shape memory alloy, or a combination thereof. Connection 1 is for high and low limit signals from the sampling unit to the logic control unit. Connection 2 is for the control driving signals from the sampling unit to the power control unit, which has a power switch function. Connection 3 connects the positive and negative poles of the battery leads to the power control unit. Connection 4 feeds the output of the power control unit, through the power lines of the battery, to the logic control unit and all the drivers for providing power thereto. Connection 5 (with two connecting wires forming a set per driver) is for the control signals from the logic control unit to a driver. Every driver drives its actuator in FIG. 3 to open or close the air vent shown in FIG. 2.

Figure 4:
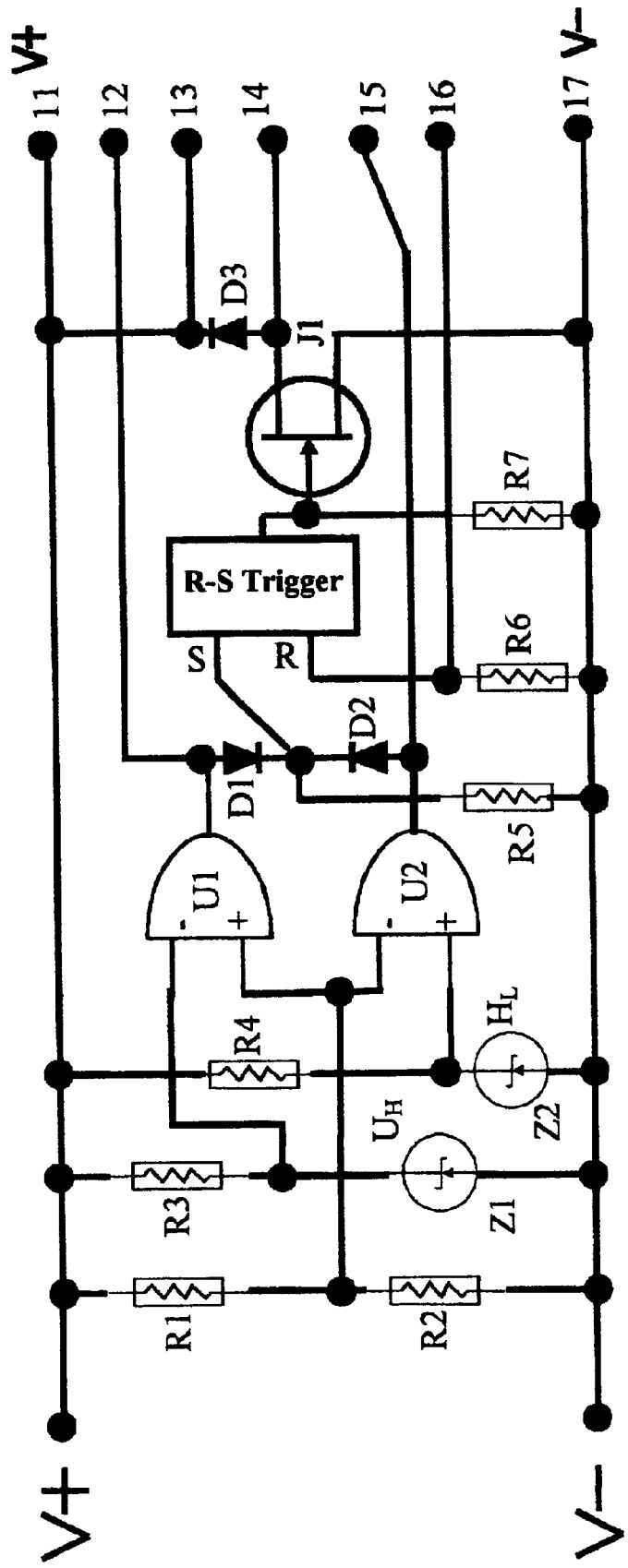
FIG. 4 Schematic of a sampling unit.

A preferred circuit design for the sampling unit in FIG. 3 is shown in FIG. 4. It consists of sampling resistors R1 and R2, reference circuit R3 and Z1, R4 and Z2, comparators U1 and U2, diodes D1 and D2, a R-S trigger, resistors R5, R6, R7, a field effect transistor J1, and a diode D3. These elements are connected according to the diagram of FIG. 4.

Figure 5:
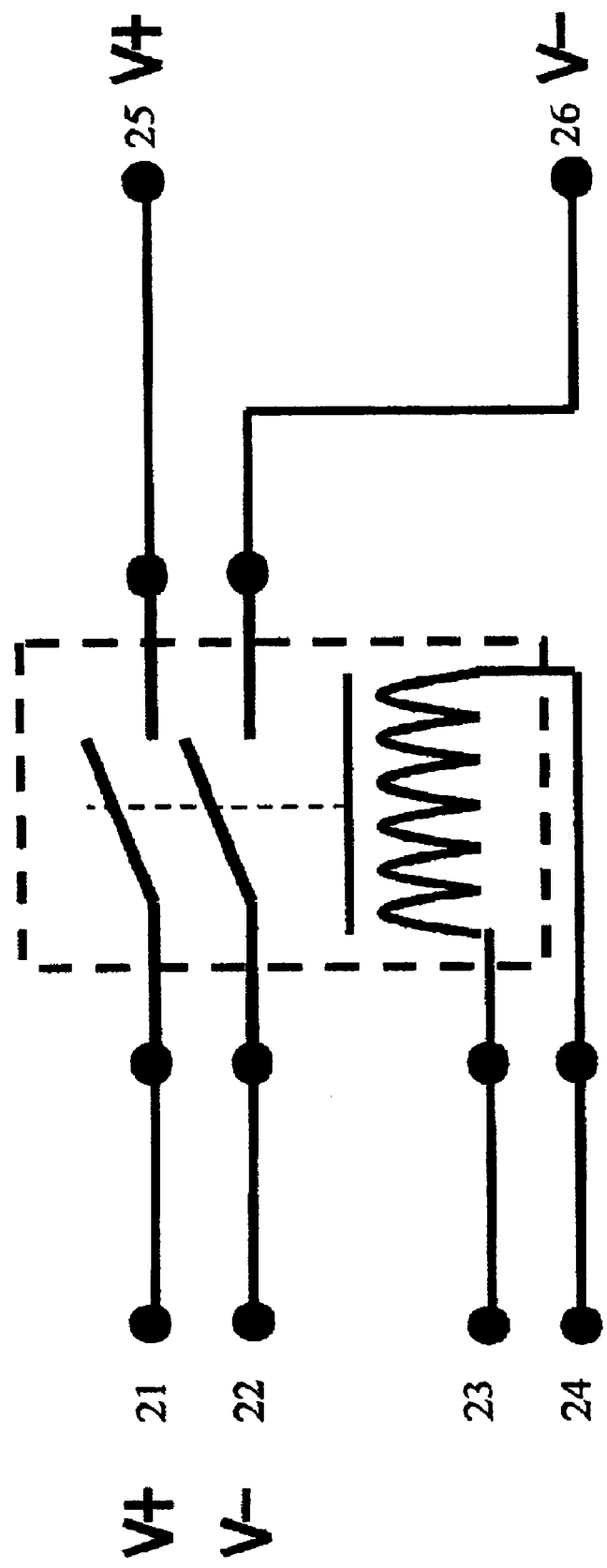
FIG. 5 Schematic of a power control unit.

Terminals 11, 17 are power lines that are respectively connected to terminals 21 and 22 of the power control unit, schematically shown in FIG. 5. Terminals 13, 14 are for the driving signals that are respectively connected to terminals 23, 24 of the power control unit (FIG. 5). Terminal 12 as a $S_H$ signal and terminal 15 as a $S_L$ signal, representing the voltage change of the battery, lead to the terminals $S_H$ and $S_L$ in FIG. 7. Terminal 16 accepts the "Off Control" signal from FIG. 7 to reset the R-S trigger.

The power control unit in FIG. 3 is further illustrated in FIG. 5. It consists of a relay, which can be a mechanical contact relay, a solid-state relay, or any other switch device driven by electricity. Terminals 21 and 22 are power lines from the sampling unit shown in FIG. 4. Terminals 23 and 24 accept the actuating current from the sampling unit to actuate the relay for connecting or disconnecting the power supply from the battery. Terminals 25 and 26 are power lines from the relay contacts to the logic control unit and all the drivers (see connection 4 in FIG. 3).

Figure 6:
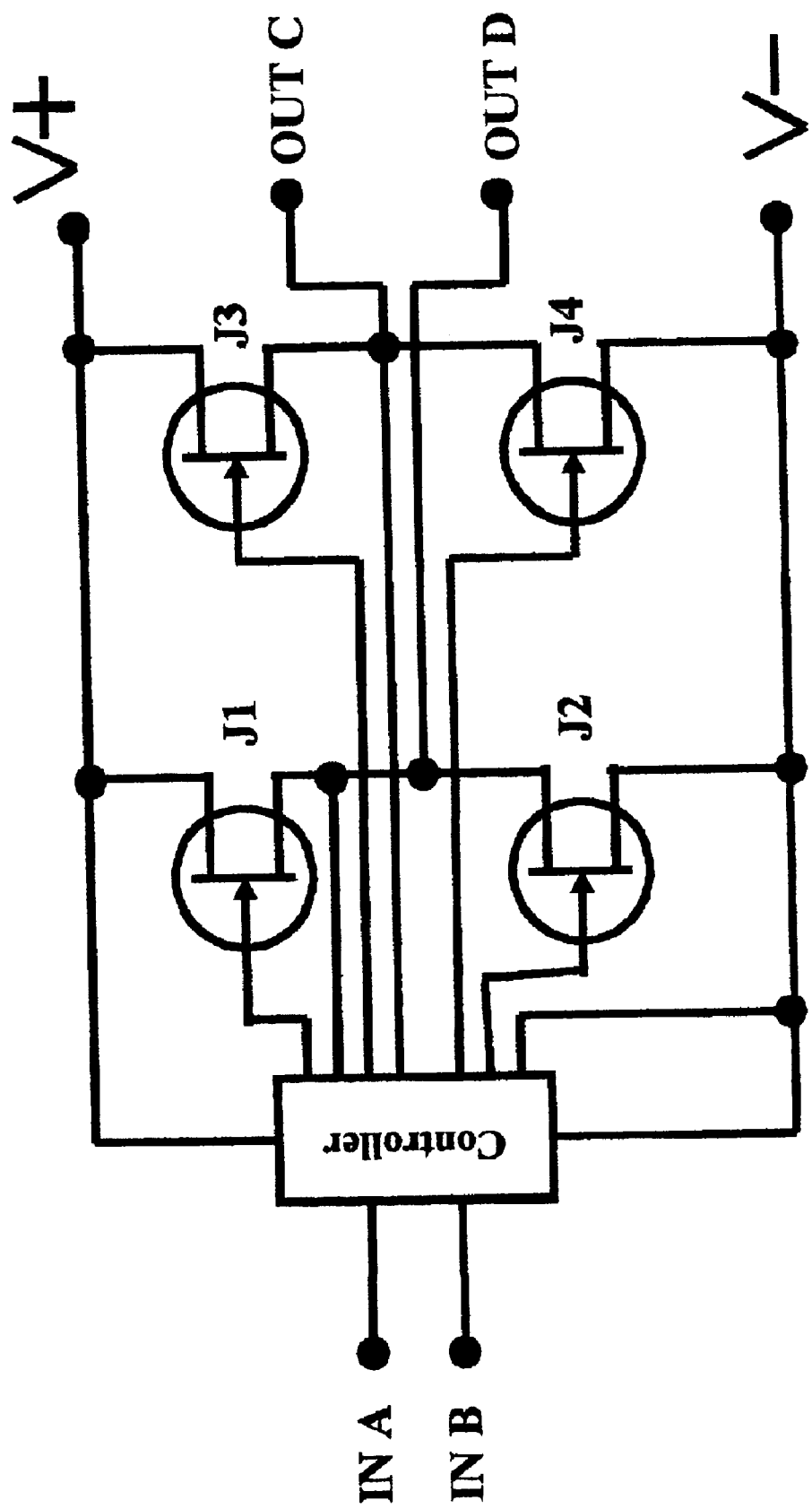
FIG. 6 Schematic of a driver unit.

FIG. 3 shows six drivers that are labeled as Driver 1 through Driver 6, preferably with each having the same structure as shown in FIG. 6. Each driver consists of four field effect transistors labeled J1 to J4, and a controller that directs the transistors to work in accordance with the switching requirements. The switching logic is described in Table 1, as follows:

TABLE 1

Switching logic.

| IN A | IN B | J1 and J4 | J2 and J3 |
|---|---|---|---|
| L | L | OFF | OFF |
| L | H | OFF | OFF |
| H | L | ON | OFF |
| H | H | OFF | ON |

Terminal IN A in FIG. 6 is an Enable control. When it is at a low electric voltage level (L), all the transistors stay in the OFF status, regardless of the IN B levels. When the IN A is at a high electric voltage level (H), the working status of the transistors depends on the voltage level of the IN B. If IN B is at L, transistors J1 and J4 are in the ON status with the J2 and J3 in the OFF status. If IN B is at H, transistors J2 and J3 are in the ON status with the J1 and J4 in the OFF status.

Figure 7:
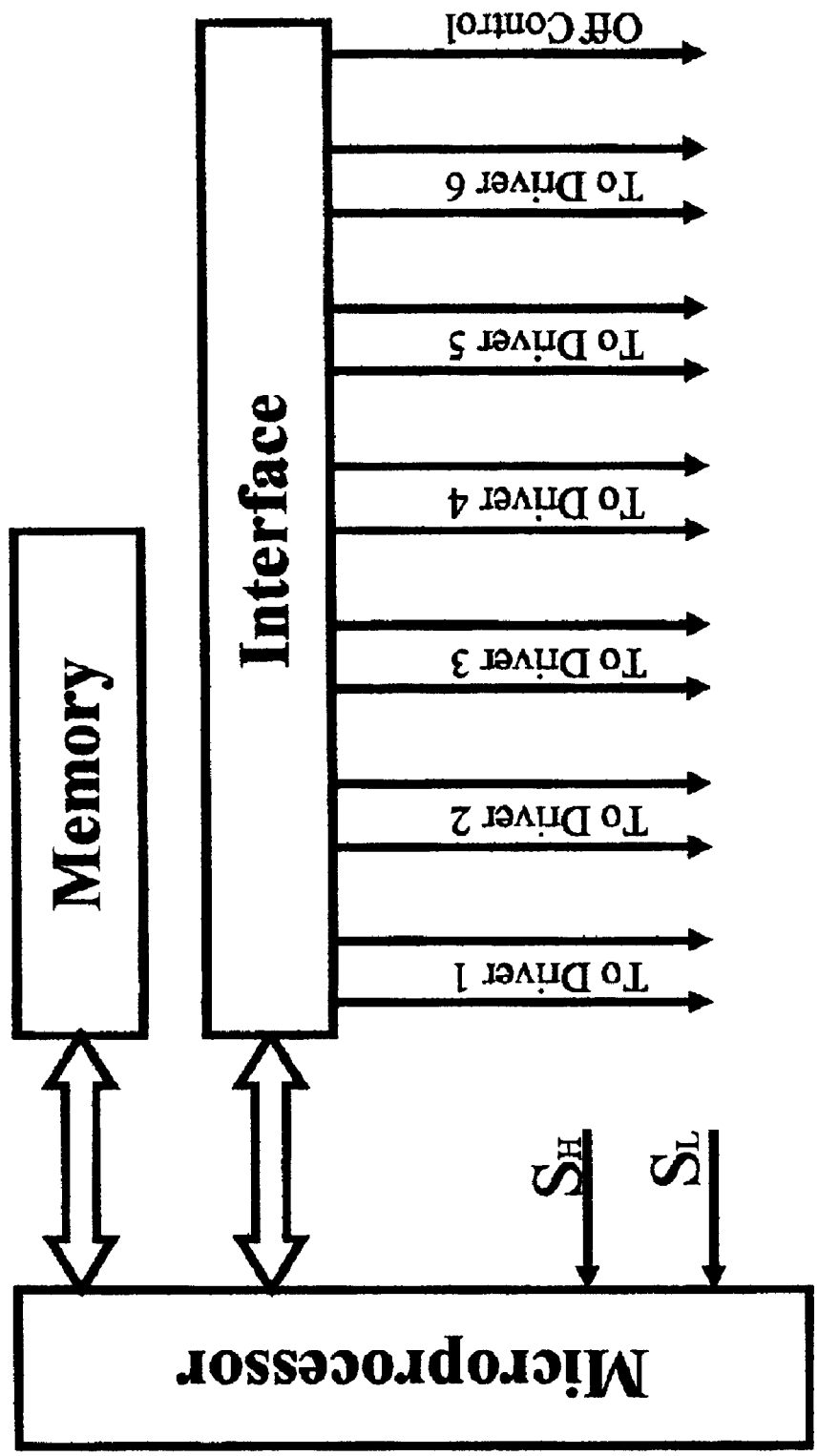
FIG. 7 Schematic of a logic control unit.
Figure 8:
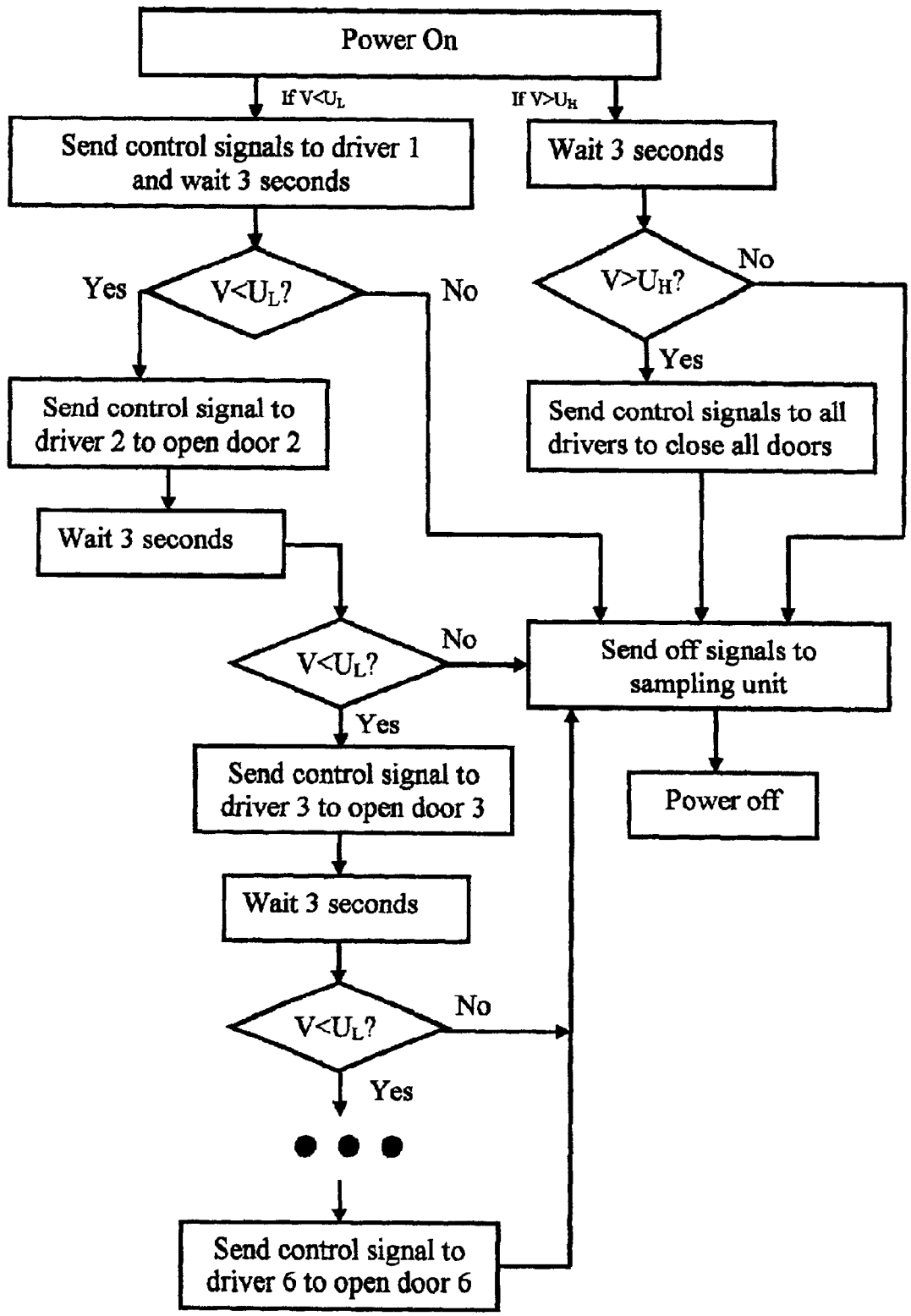
FIG. 8 A block diagram indicating the control logic of FIG. 7.

FIG. 7 shows a more detailed structure of the logic control unit indicated earlier in FIG. 3. The logic control unit preferably consists of a microprocessor, a memory chip, an interface and data/address buses. The memory stores a pre-edited program for controlling the air vent opening sequence that is shown in FIG. 8. The memory is connected to the microprocessor through a data bus and address bus. The interface in FIG. 7 sends control signals to different drivers labeled as Driver 1 through Driver 6, each with two lines as a set. One line in each set acts as the IN A function as mentioned above and the other line acts as the IN B function. The interface also sends out "off control" signal to terminal 16 in the sampling unit as shown in FIG. 4. Two signals labeled $S_H$ and $S_L$ in FIG. 7 from the sampling unit are accepted by the microprocessor.

FIG. 8 schematically shows a preferred block diagram for the control logic, with the execution instructions of the program pre-stored in the memory chip of FIG. 7. When power is switched on, there are only two conditions existing based on the design of the sampling unit: either $V<U_L$, or $V>U_H$. Here, V stands for the voltage of the battery, $U_L$ is a predetermined lower limit of the battery voltage, and $U_H$ a predetermined upper limit of the battery voltage. If $U_L \leq V \leq U_H$, power is no longer needed in the control logic system and hence, preferably, this power should be cut off so that the microprocessor stops working in order to conserve energy. If $V<U_L$, the microprocessor in FIG. 7 is powered through the power control unit in FIG. 5, thus allowing the steps specified on the left-hand side of the block diagram in FIG. 8 to proceed. If $V>U_H$, the microprocessor is also powered, allowing the steps on the right-hand side of the block diagram to proceed.

Figure 9:
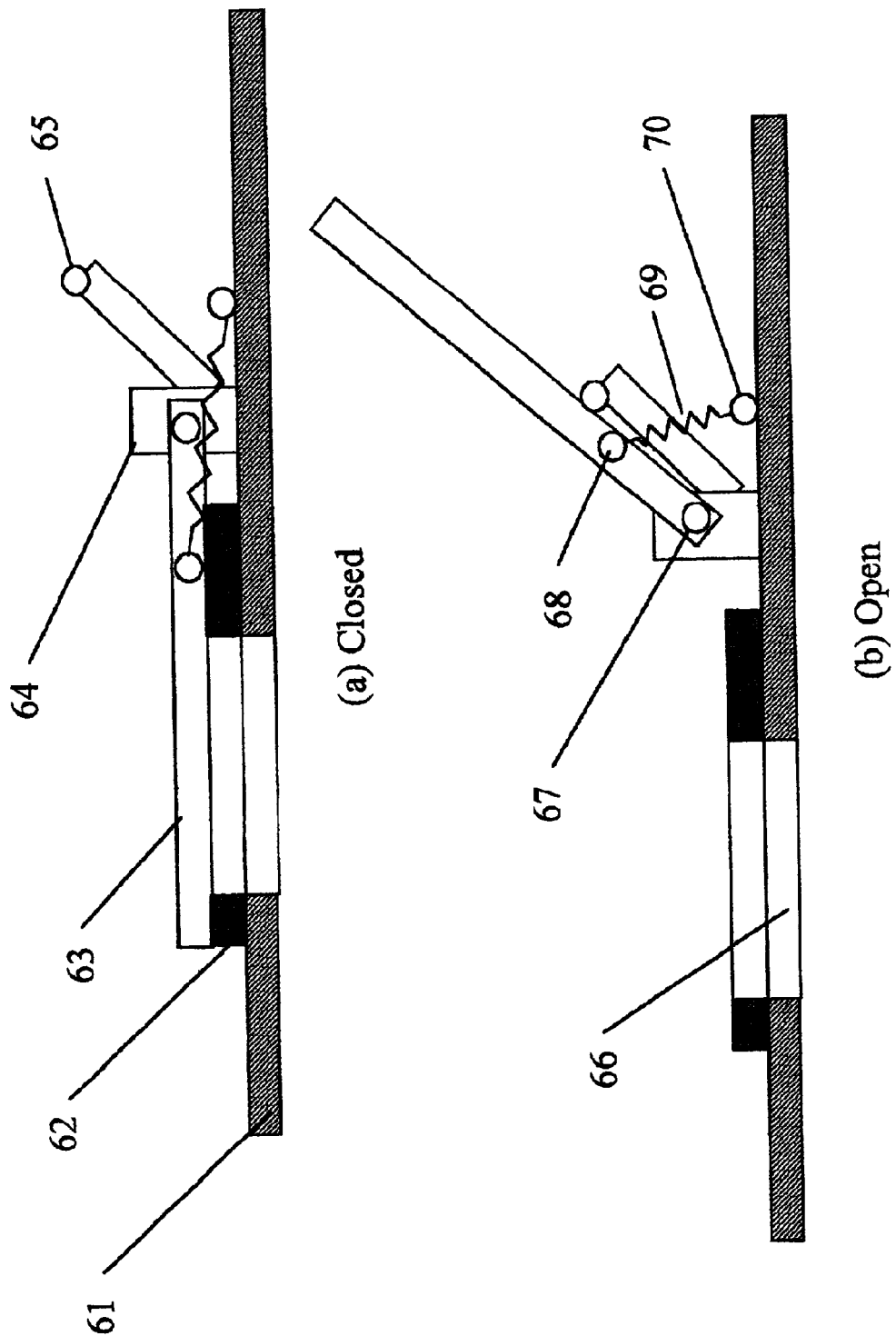
FIG. 9 A rotation-type air vent cover design.

FIG. 9 shows one of the preferred designs for a controllable air vent. An air entrance hole 66 is positioned in the battery casing wall 61. Surrounding the perimeter of the hole 66 is a rubber seal layer 62 which has a hole of the same diameter as that of hole 66. If, necessary, some seal grease may be put on the surface of the rubber layer 62. The cover 63 is driven by an electromagnetic actuator 67 to rotate around its axis located in the cover stand 64. FIG. 9(*a*) shows the air vent being in a "closed" position and FIG. 9(*b*) an "open" position. A tensioning spring 69 hinges on hooks 68 and 70 to control the cover 63, which can be in two alternate positions: "closed" or "open". A block 65 prevents the cover from moving forward when the cover is being opened.

Figure 10:
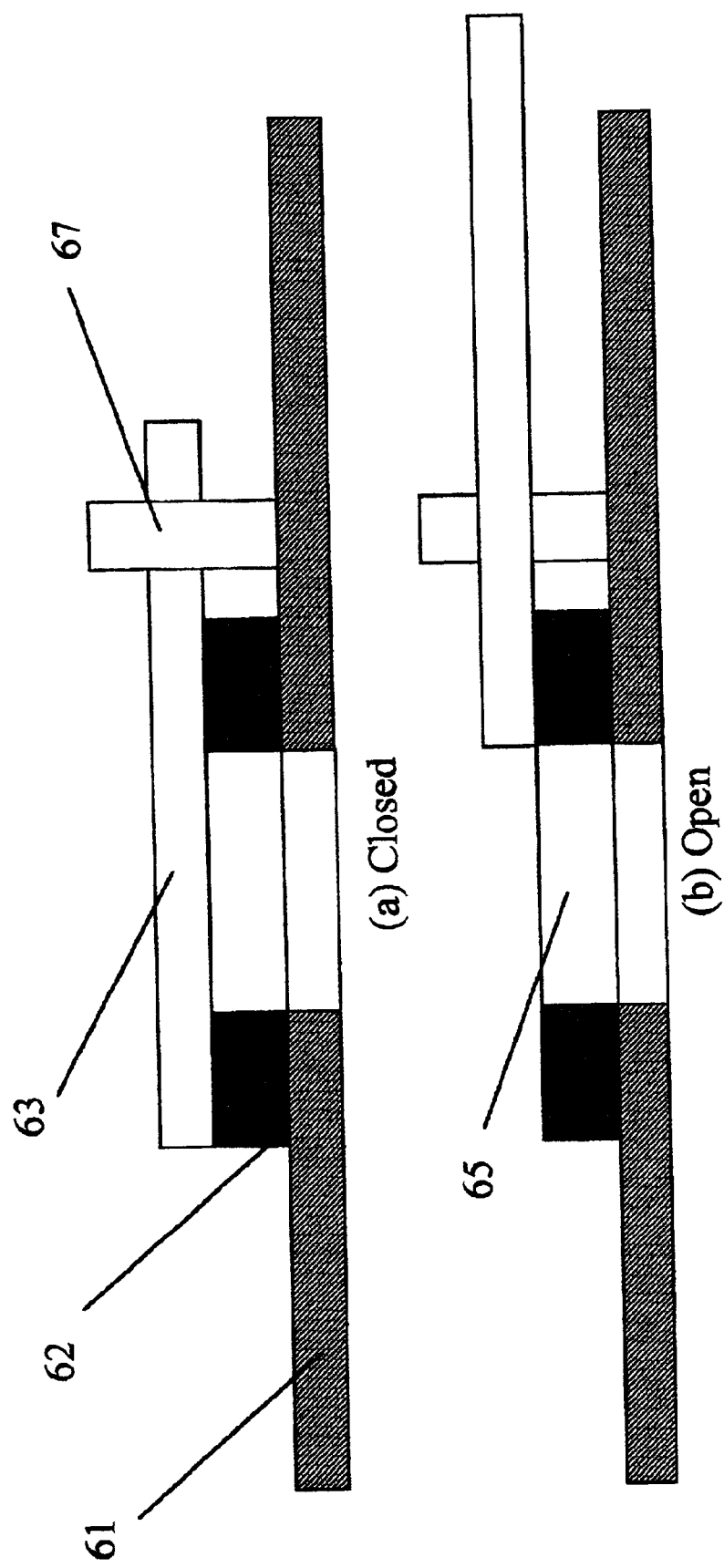
FIG. 10 A sliding-type air vent cover design.

FIG. 10 shows another possible design for a controllable air vent. Again, there is an air entrance hole 65 positioned in the battery casing wall 61 and a rubber seal layer 62 positioned around the perimeter of the air access hole 65. An electromagnetic actuator 67 is used to move the cover 63 between two alternate positions. The "closed" position, shown in FIG. 10(*a*), obstructs the air entrance and the "open" position, FIG. 10(*b*), allows the entry of air into a metal-air assembly.

Working Principles:

1. Normal Use (Continuous Use) of a Battery

Before a battery is used, preferably the battery is in one of the following two situations. In the first situation, all the air vents (e.g., V2 to V6, and the main air vent V7 in FIG. 2) are closed and V1 is open. To begin the operation of the battery, the cover of the main air vent V7 in FIG. 2 may be manually switched open, e.g. by poking off the cover with a stick or finger nail. This will allow outside air to enter inside the battery casing with some air entering the first metal-air assembly (e.g., Assembly A in FIG. 2) to initiate the battery operation.

In the second situation, all the air vents (e.g., V1 to V6, and the main air vent V7 in FIG. 2) are closed. To begin the battery operation, the primary vent cover is switched open and the cover of the first air vent (e.g., for Assembly A) is also opened, at least slightly, to allow a small amount of air to enter the cell assembly A. Thus, cell assembly A will produce a little electric power, but its output voltage may be less than $U_L$, a lower limit predetermined by a battery designer or manufacturer. The sampling unit in FIG. 3 will sense the voltage and send a control-driving signal to the power control unit through connection 2 and make the unit work to send power to the logic control unit and drivers through connection 3 and 4. Then, the powered logic control unit checks the signals from the sampling unit through connection 1 and carries out an internal calculation and sends control signals to driver 1 through connection 5. The actuator A1 driven by driver 1 acts to fully open the air vent V1 to allow more air into the cell assembly A. After a few seconds, the output voltage will be over $U_L$. The logic control unit will sense it and send an "Off Control" signal to the sampling unit through connection 6 (see FIG. 3). The sampling unit receives the signal and stops sending a driving signal to the power control unit through connection 2. The power control unit stops supplying the logic control unit and drivers with power. From this moment on, the battery stays in a normal condition to power an outer electric appliance or device.

After a first usage period (e.g., a month or so), the cell assembly A almost runs out of its energy, and the output voltage will drop below $U_L$. The sampling unit will sense the change and make the power control unit work. The logic control unit is powered again and checks the signals from the sampling unit through connection 1 (see FIG. 3). If the logic control unit determines that the battery output voltage indeed drops below $U_L$, it will send control signals to driver 2 and actuate to open the air vent V2. After a few seconds, the output voltage will rise again. If the voltage is over $U_L$, the logic control unit will send an "Off Control" signal to the sampling unit through connection 6 for stopping the power control unit from working. From the moment on, the battery stays again in a normal condition to power an external electric appliance or device.

The above procedures are repeated until the air vent V6 in FIG. 2 is open and the battery now relies mainly on the cell assembly F to supply the external device with power. After the assembly F runs out of energy, the whole battery will be thrown away or recharged.

2. Intermittent Use

The initial startup procedure of the battery for the intermittent use is the same as the above described for a continuous use. If the battery is not going to be used for a while (after a previous usage period), according to a preferred embodiment of the present invention, the battery is to close all the six air vents to prevent outer air from entering the cells in order to prolong the service life of the battery. The sampling unit, shown in FIG. 3, can sense the voltage change when an external circuit does not drain any further current from the battery. This would result in an battery output voltage being over $U_H$, a predetermined upper limit defined by a battery designer. After the sampling unit detects this voltage, it sends a control signal to the power control unit which instructs to power the logic control unit and all drivers. The powered logic control unit again measures the $U_H$ signal received from the sampling unit through connection 1 to make sure it is still over $U_H$. If it is over $U_H$, the unit will send control signals to all drivers labeled Driver 1 to Driver 6 to close the air vents V1 through V6. Then the unit will send an "Off Control" signal to the sampling unit for cutting off power supply to the logic control unit and all drivers.

After some time, the battery may be re-used again. When the electric appliance is connected to the battery, the output voltage of the battery will drop sharply to below $U_L$ due to no air entering the cells. At this moment, a similar procedure as described above will be initiated to open air vent V1 in FIG. 2. After 3 seconds or so, the logic control unit in FIG. 3 will measure the signal from the sampling unit through connection 1 and judge whether it is over $U_L$. If it is still below $U_L$, the control unit as shown in FIG. 3 will open V2. After 3 seconds again, if the voltage is still below $U_L$, the unit opens vent V3; these procedures are repeated until a proper battery voltage output is achieved (e.g., $U_L \leq V \leq U_H$). As an extreme case, when these procedures are repeated so that V6 is now open and if the voltage is still below $U_L$ after 3 seconds, the battery needs to be recharged or thrown away.

During the operation described above, if the signal checked by the logic control unit is over $U_L$, the unit will send an "Off Control" signal to the sampling unit to turn off the power from the power control unit to the logic control unit and all drivers. The battery is now in a normal status of continually supplying the outer electric appliance with power.

3. How the Sampling Unit Works

As shown in FIG. 4, resistors R1 and R2 constitute a part of the sampling circuit. The sampling voltage V between R1 and R2 leads to the inverting input of U2 and non-inverting input of U1, where U1 and U2 are voltage comparators. R3 and Z1 constitute a reference voltage circuit to produce $U_H$ mentioned above that is fed to the inverting input of U1. R4 and Z2 constitute a reference voltage circuit to produce $U_L$ mentioned above that is fed to the non-inverting input of U2. Z1 and Z2 are Zener diodes. If $V<U_L$, the level of the non-inverting input marked with + of U2 is greater than its inverting input level. The output of U2 is at the high level, making the terminal S of the R-S trigger jump from the low level to the high level through diode D2 so as to set the R-S trigger; that is, the output of the trigger becomes high. Then the field effect transistor J1 is in the ON status and the current path will be:

$V+ \rightarrow$ Terminal $13 \rightarrow$ Relay coil in FIG. 5 $\rightarrow$ Terminal $14 \rightarrow J1 \rightarrow V-$ Then the relay in FIG. 5 connects the battery power to other units. With the same principle, if $V>U_H$, the output of U1 becomes high and sets the R-S trigger to make the relay work also. Terminal 12 with signal $U_H$ and terminal 15 with signal $U_L$ are fed to the microprocessor in FIG. 7. Terminal 16 accepts the signal from the logic control unit marked with "Off Control" to reset the R-S trigger and make the J1 in the OFF status. Then the relay is released and cuts off the power supply to other units. Table 2 shows the true values of the R-S trigger:

TABLE 2

| Values of the R–S trigger. | | |
|---|---|---|
| R | S | OUTPUT |
| x | L → H | H |
| L – H | x | L |

4. How the Power Control Unit Works

The power control unit as shown in FIG. 5 acts like a switch, which is controlled by the sampling unit mentioned above. The power control unit switches on or off the power to the logic control unit and all the drivers from the battery. When the current from the sampling unit flows in the coils through terminals 23 and 24, it switches on the power; otherwise, off the power.

5. How the Driver Unit Works

The driver unit preferably consists of a H-bridge circuit controller as shown in FIG. 6. It accepts the signals from the logic control unit to power the actuators positively or reversely to open or close the air vents. Its input signals IN A and IN B come from the logic control unit. Its outputs OUT C and OUT D go to the actuators as seen in FIG. 3.

6. How the Logic Control Unit Works

The logic control unit is powered under the conditions that the battery voltage $V<U_L$ or $V>U_H$. Once powered, it measures the signal $S_L$ and $S_H$ indicated in FIG. 7. If $S_L$ is high, the interface controlled by the microprocessor will sequentially send control signals to Driver 1, Driver 2, . . . , marked on FIG. 7 until $S_L$ is at the low level. Then, the unit will send an "Off Control" signal marked on FIG. 7 to the sampling unit to turn off the power.

If $S_H$ is high, it means no device is connected to the battery. The interface will send control signals to all drivers to close all air vents, and then send an "Off Control" signal to the sampling unit to cut off the power to the logic control unit and all drivers.

7. How an Air Vent Works

Two examples of air vent designs are shown in FIG. 9 and FIG. 10. The air vent shown in FIG. 9 works by rotation and air vent in FIG. 10 works by sliding motion. The two air vents are shown to be driven by electromagnetic actuators. The contact interface between the vent cover and the rubber layer may be daubed with some type of grease to help fully seal the air entrance.

Once the main vent (V7 in FIG. 2) is opened, the first battery usage stage begins. The first cell assembly (e.g., Assembly A with V1 being open) provides the electric current during this first operating stage of the battery. During this first stage, the fact that all other air vents are closed serves to eliminate or reduce any potential self-discharge, current leakage, and corrosion problem of the anode active materials in all other cell assemblies (e.g., B through F in FIG. 2) when the first assembly works to provide electricity. This initial stage ends when the anode active material in Assembly A is almost completely consumed or no longer, by itself, capable of providing a desired power level to an external device (e.g., a mobile phone) possibly due to passivation (e.g., the formation of a zinc oxide layer, if any, on a zinc particle). At or slightly before this point of time (when it is detected that $V<U_L$), the second assembly (e.g., Assembly B), which was initially closed and protected against the attack of both the anode and electrolyte by oxygen, is now activated by opening air vent V2 to admit oxygen into all the metal-air cells in Assembly B. Assembly B, possibly with some help from Assembly A (possibly still providing week power), begins to provide electric power to an external device. When A and B are no longer capable of providing adequate power, a third cell assembly will be activated. Other cell assemblies may be activated at later stages to supply the needed power. In this situation, the cell assemblies activated earlier may still be capable of providing electric current, albeit small, to the external device. In this manner, the external device can be operated for extended periods of time and all power capacities in all cell assemblies are essentially fully utilized.

For the purpose of illustrating the concepts behind the invented battery, metal-air cells are used as an example. However, the present invention is applicable to all electrochemical cells whose operation depends upon the supply of a gas (whether it is oxygen or not). In the practice of the present invention, any metal with a negative electromotive force (emf), with reference to hydrogen as a standard, may be used as an anode active material. For metal-air applications, however, it is preferred that the anode active material is a metal or metallic alloy that contains a metal element selected from the group consisting of lithium, magnesium, aluminum, iron, titanium, manganese, nickel, chromium, and zinc. The anode active material in one metal-air cell may be the same as or different from the anode active material in other cells.

The presently invented battery with controlled activation timing achieves one or both of the following two technical goals: (a) a tentative isolation of an anode active material and electrolyte in an un-activated cell from oxygen so that no significant anode reaction will occur until after the battery voltage drops below a predetermined value; and (b) a sustained (intermittent, continuous, or otherwise programmed) use of a battery for a very long period of time.

Again, for the purpose of illustrating the utility value of the presently invented battery (containing a number of metal-air cells), the cell design parameters will be provided for a zinc-air battery system, but it must be understood that the present invention is not limited to this particular type of cell. The theoretical energy density ratio of zinc can be calculated by using physical property values readily available in physics textbooks. Zinc has a density of 7.13 g/cm$^3$ and an atomic concentration of $6.55 \times 10^{22}$ atoms/cm$^3$. Each zinc atom will give two electrons, hence there will be $(2 \times 6.55 \times 10^{22})$ electrons per cm$^3$ or 7.13 grams of zinc. Since there are $1.6 \times 10^{-19}$ coulombs per electron, we have $(2 \times 6.55 \times 10^{22}) \times (1.6 \times 10^{-19})/7.13 = 2,940$ Coulomb/gram.

But, this charge amount is available at 1.2 volts, hence the energy density in watt-hours per kilogram is: $2,940 \times 1.2 \times 1000/3,600 = 980$ watt-hours/kilogram. The results of similar calculations for other selected metals intended for use in a metal-air battery are summarized in Table 3, where the working voltages used in the calculations were approximate values.

TABLE 3

Summary of energy density calculation results for selected metal elements.

| Metal | Atomic mass, g/mole | Density, g/cm$^3$ | Valency | Estimated working voltage, V | Atoms/cm$^3$ (x 10$^{22}$) | Atoms/g (x 10$^{22}$) | Coulomb/g | Watt-hours/Kg |
|---|---|---|---|---|---|---|---|---|
| Li | 6.94 | 0.534 | 1 | 3.4 | 4.63 | 8.67 | 13,879 | 13,108 |
| Mg | 24.312 | 1.738 | 2 | 2.7 | 4.30 | 2.48 | 7,923 | 5,943 |
| Al | 26.981 | 2.699 | 3 | 2 | 6.02 | 2.23 | 10,710 | 5,950 |
| Ti | 47.9 | 4.507 | 2 | 2 | 5.66 | 1.26 | 4,022 | 2,234 |
| Mn | 54.938 | 7.47 | 2 | 2 | 8.18 | 1.10 | 3,506 | 1,948 |
| Zn | 65.38 | 7.133 | 2 | 1.2 | 6.57 | 0.92 | 2,947 | 982 |
| Cr | 51.996 | 7.19 | 3 | 1.15 | 8.32 | 1.16 | 5,557 | 1,775 |
| Fe | 55.847 | 7.87 | 2 | 0.8 | 8.48 | 1.08 | 3,449 | 766 |
| Ni | 58.71 | 8.902 | 2 | 0.65 | 9.13 | 1.02 | 3,281 | 592 |

Despite a reasonably high energy density for zinc, current commercial zinc-air batteries have achieved only 150 watt hours/kilogram. There are two principal factors that contributed to the reduction in energy density. The first is the overhead weight which includes the weights of the external case, electrolyte, and wires. The second is that only the zinc surface is involved in the chemical reaction. Specifically, just like all other metal-air batteries, current zinc-air batteries suffer from the problem of "passivation" by the formation of a zinc oxide layer that prevents the remaining anode active material (Zn) from contacting the electrolyte. There are also problems such as self-discharge or current leakage. In other words, not all Zn atoms are fully utilized in providing electrons to the external device. Earlier attempts to prevent degradation of battery performance caused by zinc oxide passivation involved adding a sufficient (usually excessive) amount of electrolyte to allow most of the zinc to dissolve. However, the large amount of electrolyte added to the cell significantly increased the total weight of the battery system, thereby compromising the energy density.

Recent efforts have focused on the development of fine powder based Zn anodes. Anodes are made by compacting powdered zinc onto brass current collectors to form a porous mass with a high surface/volume ratio. In this configuration, the oxide does not significantly block further oxidation of the zinc provided that the zinc particles are sufficiently small. With excessively small zinc particles, however, all zinc particles could be rapidly consumed and the battery will not last long. An optimum zinc particle size for a particular Zn-electrolyte combination must be carefully determined in order for the zinc-air battery to function as a long lasting power source. Alternatively, very thin sheets of zinc may be used as an anode active material.

Comparative Design Case 1

To further illustrate the battery design concepts inherent in the present invention, let us use a current zinc-air battery (Model EF-M2-33 for use in Motorola StarTAC mobile phone) as an example. The battery is rated at a power capacity of 3300 mAh×3.6 v=11.88 watt-hours. The battery is designed to provide a "talk time" of 6–16 hours or "stand-by" time of 80–350 hours (3.33–14.6 days). With an energy density of 980 watt-hours/Kg for Zn, this capacity requires at least 12.1 grams of Zn (i.e., 11.88/980=0.0121 Kg). In actuality, much more Zn was used in this commercially available battery. The total weight of this battery (Zn plus overhead weights) is rated at 79 grams.

In order to extend the "stand-by" time to 30 days, an approximate Zn anode amount of 25 grams will be required, provided that all 25 grams of Zn is fully utilized. Unfortunately, by simply doubling the amount of unprotected Zn in anode does not double the "stand-by" time, largely due to the problems of passivation, current leakage, and self-discharge (e.g., through direct ZnO formation in the electrolyte without providing electrons to the external device, the mobile phone). There appears to be an approximately 60% utilization efficiency only for the second 13 grams.

Comparative Design Case 2

In accordance with the present invention, a new Zn-air battery can be designed in such a way that the first 12 grams of Zn, in a fine powder form (average particle size of 8–20 $\mu$m), is packed together and attached to a copper-based current collector. This first 12 grams of Zn in contact with the KOH electrolyte (just like in a conventional Zn-air cell) is packed in a first cell assembly and provides the first 14 days of stand-by time to a mobile phone. This first 12 grams of Zn in the present invention is referred to as the "initial-stage" anode active material. The next 13 grams of Zn, also in the form of fine particles in KOH, is used in the second cell assembly and gets activated after slightly less than 14 days. This 13 grams of Zn provides approximately 16 days of stand-by time, making the total stand-by time now up to 30 days. This is possible due to the fact that, with the controlled-timing activation, it is less likely to have self-discharge or current leakage associated with this extra 13 grams of Zn. This is achieved by adding 13 grams of Zn, plus perhaps additional 13 grams of overhead materials (extra electrolyte, slightly more casing material, etc.), to the total weight of the battery. With a total battery weight of (79+26=105 grams) providing a power of 24.5 watt-hours, the over-all battery energy density is now (24.5/0.105=233 watt-hours/Kg), which reflects a major improvement from (11.88/79=150 watt-hours/Kg). By incorporating additional amounts of anode active Zn in other cell assemblies designed to be activated at much later times, a battery providing a mobile phone stand-by time of two or three months with an over-all energy density of better than 400 watt-hours is now possible.

Comparative Design Case 3

Assume that 12 grams of Zn is used as the first-stage anode active material, as in the above Comparative Case 2. The next 12 grams of first anode active material is now magnesium powder particles with an average particle size of 20 $\mu$m. Assume that 12 grams of Mg are exposed to air after 14 days. The additional battery life provided by this amount of Mg may be calculated as follows: Mg has an energy density of up to 5942 watt-hours/Kg (Table 3). The 12 grams of Mg will buy us an extra period of N=(5942/980×(14×12/12)=84.8 days. Hence, the total anode now provides a total stand-by time of (14+84.8=98.8 days) with a total capacity of (11.88+5942×0.012=83.18 watt-hours). This is achieved by adding only 12 grams of Mg to the otherwise Zn-air battery, plus approximately 13 grams of overhead weight. The over-all battery energy density is now (83.18/0.105=792 watt-hours/Kg). This ultra-high energy density can be further increased if additional amount of Mg is used in Mg-air cells in additional cell assemblies. An impressive 1000 watt-hours/Kg of battery density is readily achievable if the anode active material is lithium (energy density=13,107 watt-hours/Kg of Li) instead of magnesium and stays free of oxygen until it is needed. This would not have been possible if unprotected Zn had been used as the only anode active material mainly due to passivation, self-discharge, and current leakage. Further, this would not have been possible if unprotected Li had been used as the only anode active material mainly due to self discharge and corrosion problems (otherwise, Li would be readily oxidized even before the Li anode begins to provide electricity). The fact that the controlled-timing activation functions to expose an anode active material to oxygen at the correct timing and to protect an anode active material against corrosion and self-discharge makes this class of exceptionally long operating life batteries technically feasible and economically viable.

What is claimed is:

1. A battery comprising at least a first metal-air cell assembly and a second metal-air cell assembly electronically connected in parallel, wherein said first cell assembly comprises a first casing with a first controllable air vent thereon and at least a first metal-air cell inside said first casing, wherein said first controllable air vent is closed during a battery storage period and is opened in response to a first programmed signal in order to allow outside air or oxygen to enter said at least a first metal-air cell through said first air vent to activate operation of said first metal-air cell assembly;

said second cell assembly comprises a second casing with a second controllable air vent thereon and at least a second metal-air cell inside said second casing, wherein said second controllable air vent is closed during a battery storage period and is opened in response to a second programmed signal in order to allow outside air or oxygen to enter said at least a second metal-air cell through said second air vent to activate operation of said second metal-air cell assembly; and control means for sending programmed signals to open up said at least first and second vents at the same time or at different moments of time in a programmed fashion.

2. The battery as set forth in claim 1, wherein said first cell assembly comprises at least another electrochemical cell which is electronically connected in series or in parallel to said first metal-air cell.

3. The battery as set forth in claim 1, wherein said second cell assembly comprises at least another electrochemical cell which is electronically connected in series or in parallel to said second metal-air cell.

4. The battery as set forth in claim 2, wherein said another electrochemical cell is a metal-air cell.

5. The battery as set forth in claim 3, wherein said another electrochemical cell is a metal-air cell.

6. The battery as set forth in claim 1, wherein said first air vent and/or second air vent is closed when said battery is not in operation.

7. The battery as set forth in claim 1, wherein said first air vent or second air vent is equipped with an actuator means that operates to open or close said first air vent or said second air vent responsive to programmed signals from said control means.

8. The battery as set forth in claim 7, wherein said actuator means comprises an actuator element selected from the group consisting of a bi-metal device, a thermo-mechanical device, a piezo-electric device, a shape memory alloy, an electromagnetic element, or a combination thereof.

9. The battery as set forth in claim 1, wherein said control means comprises a sampling unit and a logic circuit to determine the timing at which an air vent is opened.

10. The battery as set forth in claim 1, wherein at least one of said controllable air vents is re-closeable and is re-closed responsive to a programmed signal from said control means.

11. The battery as set forth in claim 1, wherein at least said second controllable air vent is opened when a voltage output of said battery, when in use, drops below a predetermined low threshold voltage.

12. The battery as set forth in claim 10, wherein at least one of said controllable air vents is re-closed when a voltage output of said battery exceeds a predetermined high threshold voltage.

13. The battery as set forth in claim 1, wherein said programmed fashion comprises a mode of sequential timing at which said air vents are opened or closed in a predetermined sequential fashion.

14. The battery as set forth in claim 9, further comprising a power-control unit to regulate a power input to said logic control unit and wherein said power input is switched off to conserve battery power after said control unit determines that no opening or closing of any of said air vents is needed.

15. The battery as set forth in claim 1, further comprising a main casing to house said at least first and second cell assemblies.

16. The battery as set forth in claim 15, wherein said main casing comprises an air vent which is closed during an initial battery storage period and is opened manually to begin the operation of said battery.

* * * * *